Sept. 8, 1970  ICHIRO WADA  3,527,095
ELECTROMAGNETIC FLOWMETER
Filed April 10, 1968  2 Sheets-Sheet 1
FIG. 1
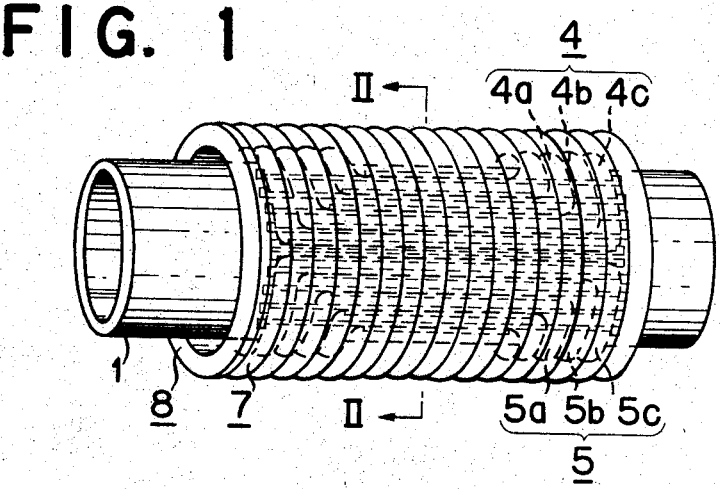
FIG. 2
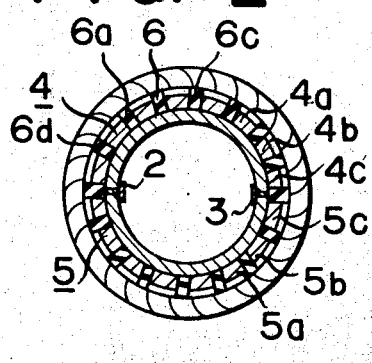
FIG. 3
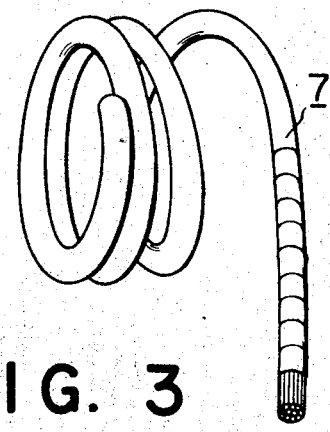
FIG. 4
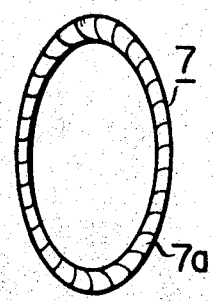
FIG. 5-a  FIG. 5-b  FIG. 5-c  FIG. 5-d
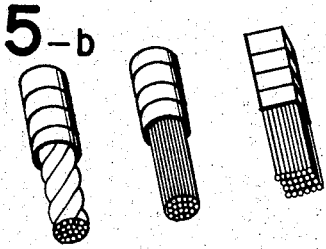
INVENTOR:
ICHIRO WADA.
BY

United States Patent Office 3,527,095
Patented Sept. 8, 1970

3,527,095
ELECTROMAGNETIC FLOWMETER

Ichiro Wada, Yokohama-shi, Japan, assignor to Tokyo Shibaura Electric Co., Ltd., Kawasaki-shi, Japan, a corporation of Japan
Filed Apr. 10, 1968, Ser. No. 720,749
Claims priority, application Japan, Apr. 15, 1967, 42/31,590
Int. Cl. G01f 1/00
U.S. Cl. 73—194                                    4 Claims

ABSTRACT OF THE DISCLOSURE

A pair of opposed electrodes are mounted on the inner surface of a conduit adapted to pass fluid in contact therewith, an exciting coil is wound around the conduit to create magnetic flux perpendicular to a line interconnecting the electrodes and to the direction of flow of the fluid and a single strand or a bundle of magnetic strands is closely wound around the exciting coil to form a cylindrical core acting as the flux path.

---

This invention relates to electromagnetic flowmeters and more particularly to improved core constructions for electromagnetic flowmeters.

As is well known in the art the electromagnetic flowmeter generally comprises a pair of opposed electrodes mounted on the internal surface of a conduit adapted to pass fluid in contact therewith, an exciting winding mounted on the outer periphery of the conduit to create magnetic flux at right angles to the direction of fluid flow and also perpendicular to a straight line interconnecting said pair of electrodes, and a cylindrical core surrounding the exciting coil to form a magnetic circuit for the magnetic flux. A prior cylindrical core is divided by insulators which are spaced by a predetermined spacing in the axial direction of the conduit for the purpose of preventing eddy currents from being induced in the core and each of the divided core sections is comprised by a plurality of laminations stacked in the radial direction of the conduit. However, as each core section is comprised by a laminated structure of a strip of suitable width, eddy currents are still induced in each core section, thus introducing errors in the measurement. Further, while these core sections are interconnected by an axial rod member to have the same potential, this measure is not sufficient so that each core section would still tend to have an independent potential. For this reason, potentials between each core section and the exciting winding, between each core section and ground, and between the exciting winding and ground would become different thus introducing errors in the output signal.

In order to prevent displacement of the exciting winding and to fix in position respective cylindrical core sections around the winding a spacer is inserted between core sections and the conduit. However as the gap between the cylindrical core sections and the spacer is varied due to heat or vibration it is desirable to decrease the manufacturing tolerance in order to prevent such variation in the gap from affecting the accuracy of the measurement.

Further, where each of the core sections is fabricated by spirally winding a strip of magnetic material upon an arbor or mandrel it is necessary to prepare independent arbors for conduits of different diameter, thus increasing the cost.

According to this invention the above described defects can be eliminated by fabricating the cylindrical core around the exciting winding of magnetic strands. More particularly, the cylindrical core may be made by helically winding a wire core member consisting of a bundle of magnetic strands, or by winding the bundle in the form of a ring or by winding a magnetic strand according to a well known filament winding technique.

The invention can be more fully understood from the following detailed description taken in connection with the accompanying drawings in which:

FIG. 1 is a perspective view of one embodiment of this invention;

FIG. 2 is a section taken along a line II—II in FIG. 1 to show the manner of mountnig a winding upon a conduit;

FIG. 3 is a perspective view of a wire core member utilised in the embodiment shown in FIG. 1;

FIG. 4 is a perspective view illustrating a modified wire core member;

FIGS. 5a, 5b, 5c and 5d are partial views illustrating other forms of the wire core member;

Figure 6:
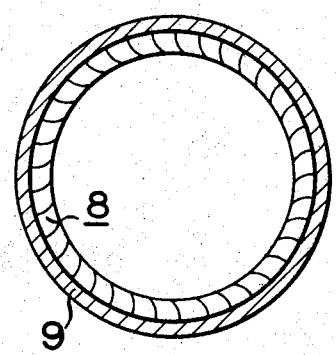
FIG. 6 shows a section showing the manner of mounting the wire core member in an out core.

Referring now to the accompanying drawings, as shown in FIGS. 1 and 2, a pair of opposed electrodes 2 and 3 for deriving output signals are mounted in contact with fluid to be measured in the interior of an electroconductive conduit 1 adapted to pass said fluid. Exciting coils 4 and 5 are disposed to surround conduit 1 to create magnetic flux perpendicular to an imaginary line interconnecting the pair of electrodes 2 and 3 and also perpendicular to the direction of flow of the fluid. These exciting coils 4 and 5 are respectively comprised by a plurality of pairs of loop formed coils 4a, 4b, 4c . . . and 5a, 5b, 5c . . . which oppose in symmetry with respect to the axis of the conduit 1. The number of turns of each loop shaped coil is determined by the so-called cos θ distributed winding wherein the number of turns of the coil at a position displaced by an angle θ from a section interconnecting electrodes 2 and 3 and including the axis of the conduit 1 is proportional to cos θ. These loop formed coils are connected in series. Rod shaped spacers 6a, 6b, 6c . . . of rectangular cross-section are interposed in longitudinal gaps between adjacent loop formed coils to prevent displacement thereof.

A wire core member 7 is wound around these exciting windings 4 and 5 covering substantially the whole surface of windings 4 and 5 and spacers 6a, 6b, 6c . . . . The wire core member may be wound helically with its turns closely contacted or as shown in FIG. 4 a plurality of pre-formed rings 7 may be closely mounted upon the assembly consisting of exciting coils and spacers. In any case, a cylindrical core covering substantially the whole surface of windings 4 and 5 is obtained.

The strand comprising the wire core member 7 may consist of 0.08% of carbon, 0.3% of silicon, 0.6% of manganese, 0.045% of phosphorous, 0.045% of sulphur and the balance iron, for example, 55 strands, 1.1 mm. diameter each, are gathered together into a bundle of 10 mm. diameter, and the bundle is coated with an insulating film consisting of a layer of formale varnish of 0.03 mm. thick.

A number of strands may be twisted as shown in FIGS. 5a and 5b, or a plurality of linear parallel strands may be bonded together by means of a suitable binder. The cross-section of the bundle of strands may be circular, as shown in FIG. 5c or rectangular, as shown in FIG. 5d.

Although in the above described embodiment the wire core member 7 is directly wound upon the outer surface of spacers 6a, 6b, 6c . . . to form the cylindrical core 8, in case where the cylindrical core 8 is secured to the out core 9 of the electromagnetic flowmeter, as shown in FIG. 6, the wire core member 7 is first helically wound on the out core 9 to form a cylindrical core 8, and then the core 8 may be secured to the out core 9 by an adhesive.

Instead of utilising a bundle of strands, a single strand may be wound by a well known filament winding technique to form a honey comb shaped cylindrical core in a manner to be described hereunder.

Figure 7:
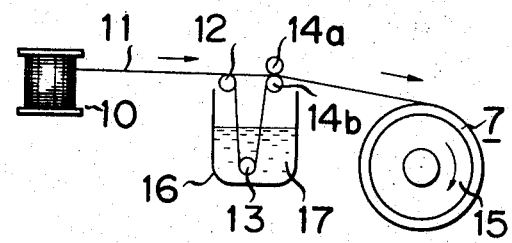
FIG. 7 is a diagrammatic representation of a device for forming a wire core according to a filament winding method.
Figure 8:
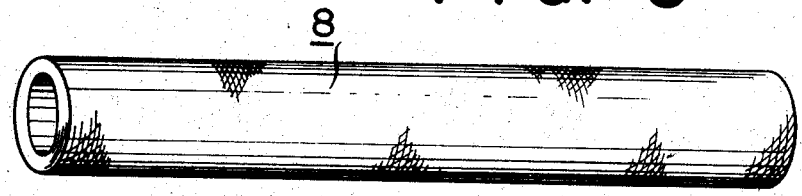
FIG. 8 is a perspective view of a wire core wound by the device shown in FIG. 7.
Figure 9:
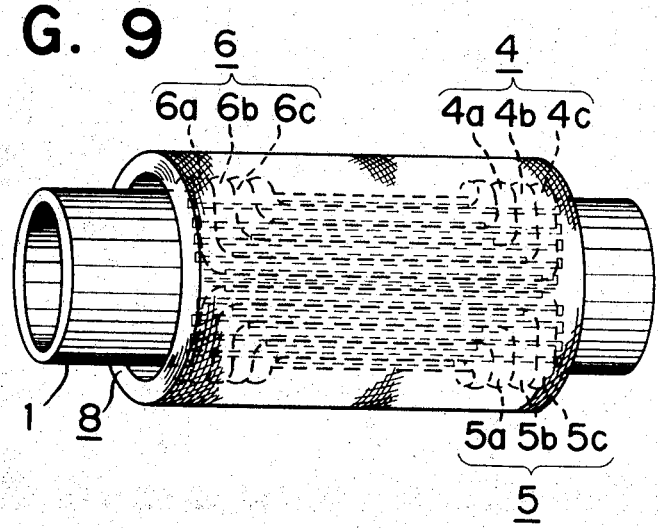
FIG. 9 shows a perspective view of a modified embodiment of this invention utilising the wire core shown in FIG. 8.

Thus, for example, as shown in FIG. 7, a strand 11 wound on a reel 10 is fed to a take up reel 15 via guide rolls 12, 13, 14a and 14b to form a honey comb. The guide roll 13 is immersed in a body of solution of a suitable adhesive contained in a tank 16 so that turns of the strand wound upon the reel 15 are bonded together when the adhesive is heat cured to form a cylindrical core 8, as shown in FIG. 8, which is subsequently mounted upon an assembly comprising exciting coils 4a, 4b, 4c . . . and 5a, 5b, 5c . . . and rectangular spacers 6a, 6b, 6c . . . as shown in FIG. 9.

The advantages of the electromagnetic flowmeter are as follows:

As described hereinabove, an insulated strand is used which has an insulating resistance of $10^{12}$ ohms which is much higher than 50 ohms of laminated silicon steel sheets or sintered iron oxide so that eddy current loss and errors of measurement can be greatly reduced. In addition to high insulating resistance of the strand itself, as a strand or a bundle of strands is wound into a cylindrical core, when compared with the conventional construction wherein the cylindrical core is formed by winding or laminating a strip of magnetic material, the width of the core is reduced, thus decreasing the eddy current.

In the above described embodiments, as a wire core member or a strand is wound from one end to the other, in continuously and closely contacted relationship, when compared with the conventional cylindrical core having axially divided sections, flux density at various portions, especially at portions near electrodes, becomes uniform with the result that erroneous signals caused by uneven distribution of magnetic flux can be effectively prevented.

With the conventional construction variation in the gap between the cylindrical core and the spacer has affected the accuracy of measurement. In contrast, in any of the embodiments of this invention, there is no fear of creating such gap, thus relieving the necessity of extremely high dimensional accuracy.

Where the wire core member is directly wound upon the spacers labour and time involved in pre-forming the cylindrical core on a mandrel are saved. This is especially advantageous where cylindrical cores of different diameters are to be made in which case it has been required to prepare a number of mandrels of different diameters. When using twisted strands as shown in FIGS. 5a and 5b, even when the strands expand due to heat, the bundle of strands swells uniformly without forming any local slack whereby erroneous measurement can be precluded.

When the fluid in the conduit is stagnant a zero noise signal output of the same phase as the normal output signal is obtained across two electrodes. With the prior construction such a zero noise signal output amounted to 5 to 8% of the signal output for a predetermined flow quantity of the fluid but according to this invention it was reduced to 1%, thus increasing the accuracy of the measurement.

Noise caused by the third or fifth harmonic contained in the output signal causes the amplifier connected to output terminals to saturate thus imparing its amplifying action. In the conventional construction these harmonics were contained as much as 15 to 20%, but according to this invention they were reduced to only 6%. One cause of generating such third harmonic is the loss of magnetic symmetry. Thus, for example, 0.5 mm. longitudinal displacement of the exciting coil results in the loss of magnetic symmetry thus creating the third harmonic. In contrast, according to the construction of this invention, even displacements of the exciting coil more than 10 mm. do not cause any loss of magnetic symmetry and hence the third harmonic is not generated.

In view of the above, it will be evident that many modifications and variations are possible in the light of the above teachings. It therefore is to be understood that within the scope of the appended claims the invention may be practiced otherwise than as specifically described.

What is claimed is:

1. An electromagnetic flowmeter comprising:
  a conduit adapted to pass fluid, the flow of which is to be measured;
  a pair of opposed electrodes on the inner surface of said conduit;
  an exciting winding having a substantial axial dimension mounted on the outer periphery of said conduit to create alternating magnetic flux perpendicular to a line interconnecting said pair of electrodes and also perpendicular to the direction of flow of said fluid in said conduit; and
  a cylindrical core located around substantially the whole surface of said exciting winding; said cylindrical core including at least two adjacent turns of stranded or multifilament magnetic material wound around said exciting winding.

2. An electromagnetic flowmeter according to claim 1 wherein said stranded material is helically wound around said exciting winding to form said adjacent turns.

3. An electromagnetic flowmeter according to claim 1 wherein said cylindrical core comprises a plurality of rings forming said adjacent turns, each of said rings comprising magnetic strands formed into a ring.

4. An electromagnetic flowmeter comprising: a conduit adapted to pass fluid, the flow of which is to be measured; a pair of opposed electrodes on the inner surface of said conduit; an exciting winding having a substantial axial dimension, mounted on the outer periphery of said conduit to create alternating magnetic flux perpendicular to a line interconnecting said pair of electrodes and also perpendicular to the direction of flow of fluid in said conduit; and
  a cylindrical core located around substantially the whole surface of said exciting winding; said cylindrical core comprising a single magnetic strand helically wound into a honey comb.

References Cited

UNITED STATES PATENTS

| | | | |
|---|---|---|---|
| 3,243,519 | 3/1966 | Parstorfer | 179—100.2 |
| 3,094,000 | 6/1963 | Kass | 73—194 |
| 2,962,679 | 11/1960 | Stratton | 336—83 |
| 2,885,646 | 5/1959 | Bugg | 336—221 |
| 2,867,119 | 1/1959 | Sturgeon | 73—194 |
| 2,510,598 | 6/1950 | Oles | 154—80 |

RICHARD C. QUEISSER, Primary Examiner

J. WHALEN, Assistant Examiner

U.S. Cl. X.R.

335—297; 336—234